United States Patent [19]

Spivak

[11] 4,188,909
[45] Feb. 19, 1980

[54] INTRODUCTION AND ACCLIMATION DEVICE FOR MARINE AQUARIUMS

[76] Inventor: Marvin J. Spivak, 8212 Inverness Hollow Ter., Potomac, Md. 20854

[21] Appl. No.: 945,010

[22] Filed: Sep. 22, 1978

[51] Int. Cl.² ............................................. A01K 63/00
[52] U.S. Cl. ...................................................... 119/5
[58] Field of Search ....................................... 119/5, 3

[56] References Cited

U.S. PATENT DOCUMENTS

| 833,418 | 10/1906 | Ruckl | 119/3 |
|---|---|---|---|
| 2,984,208 | 5/1961 | Kopietz | 119/5 |
| 3,304,645 | 2/1967 | Hardesty et al. | 119/3 |
| 3,491,722 | 1/1970 | Levitov et al. | 119/5 |
| 4,029,050 | 6/1977 | Genest | 119/5 |

Primary Examiner—Jay N. Eskovitz

Attorney, Agent, or Firm—Oblon, Fisher, Spivak, McClelland & Maier

[57] ABSTRACT

A device for introducing and acclimating marine inhabitants to a new environment is disclosed. The device, containing the new inhabitant and the water in which it was transported, is hung from an edge of the aquarium with a portion of the device submerged. A quantity of water from the aquarium, which has been poured into another portion of the device, is allowed to drain at a controlled rate into the portion containing the new inhabitant thereby gradually diluting the transportation water. When the transportation water has been fully diluted and its temperature has become equal to that of the water in the aquarium, the device may be opened to allow the inhabitant to swim out, with minimal shock to bodily systems.

7 Claims, 4 Drawing Figures

INTRODUCTION AND ACCLIMATION DEVICE FOR MARINE AQUARIUMS

BACKGROUND OF THE INVENTION

1. Field of the Invention

This invention relates in general to a new and improved introduction and acclimation device for use in introducing marine inhabitants into an aquarium environment.

2. Description of the Prior Art

Marine inhabitants, such as marine fish or invertebrates, are extremely sensitive to the conditions of their liquid environment. Conditions such as temperature, salinity, ph, nitrites, ammonia and the overall chemical makeup of the water have a drastic effect on the well-being of marine inhabitants. A sudden change in any of these conditions results in shock which frequently produces disease or death to the marine inhabitant.

It is well known that the introduction of a new marine inhabitant into an aquarium is one of the most traumatic events that it will ever endure. In order to produce a successful introduction, it is necessary to acclimate the marine inhabitant to his new environment with high accuracy and with as little trauma as is possible.

The traditional method of acclimating aquatic animals has been to arbitrarily float the container, usually a plastic bag, in which the marine inhabitant was transported, in the aquarium for a period of time, such as thirty minutes. Due to thermal transmission through the walls of the container, the temperature of the water in the container used for transportation thus should become equal to that of the water in the aquarium. The container is then opened and the marine inhabitant is allowed to swim out. While this method is usually reasonably effective for fresh water inhabitants, it produces less than satisfactory results with marine inhabitants. Thus, for marine inhabitants, the aquarist would commonly float the transportation container for a period of, for example, thirty minutes and then periodically apply a small quantity of water from the aquarium to the container in which the marine inhabitant had been transported. Usually, this manual pouring procedure is repeated every few minutes over a period of thirty minutes or longer. While somewhat satisfactory, the above procedure is very time consuming and is at best experimental in nature.

Moreover, marine inhabitants are usually in a very agitated state during and after their introduction into a new environment. Even the most careful of aquarists has met failure when the marine inhabitant he is introducing has jumped through the opening of the transportation container while the aquarist was adding water to effect the acclimation.

An example of a prior art device designed to accomplish acclimation in a more orderly and convenient fashion is described by U.S. Pat. No. 3,491,772 to Levitov et al. In this device a differential in hydrostatic pressure from outside to inside a plastic device partially submerged in an aquarium is utilized to produce a controlled intermingling of the aquarium water with that in which a fish was transported. While this device achieves acclimation automatically, it is not without shortcomings. For instance, the rate of intermingling is controlled by a complicated procedure of adjusting a valve and simultaneously having to select a particular and variable depth of submergence into the aquarium of the acclimation device. Moreover, the flow of water into the device is by means of a submerged opening. Since the actual flow of water cannot be directly observed, it is difficult to determine and control the rate of acclimation. Additionally, the flow rate is controlled by both the difference in levels of the water inside and outside of the device and by means of the integral valve mechanism. Thus, for a given valve setting, the rate of flow of water into the device will vary as a function of the changing differential in water levels. As before, this factor makes it difficult to accurately determine and control the rate of acclimation. Another shortcoming is the inability of this device to maintain the water in the aquarium separate from the transportation water, as is desired by many aquarists.

Another prior art device for introducing and acclimating marine inhabitants is a container having a fixed orifice in its bottom. The marine inhabitant to be introduced is placed in this container along with its transportation water and the entire device is floated in the aquarium. Due to the opening in the bottom of the device, water flows from the aquarium into the device and, as a result, the device gradually sinks into the aquarium. Eventually the entire device becomes submerged and the newly introduced marine inhabitant is free to swim or float into the aquarium. While again somewhat satisfactory, some of the difficulties with the use of the device are that the device sinks into the tank and thus must be manually removed, which is inconvenient and may result in the introduction of contaminants into the aquarium, and, because the device sinks into the aquarium, it is not possible to prevent the introduction of the transportation water into the aquarium. Moreover, with this device, the aquarist has no means for insuring that the temperature of the diluted transportation water has become equal to the temperature of the water in the aquarium.

SUMMARY OF THE INVENTION

Accordingly, it is an object of the present invention to provide a new and useful device for the automatic acclimation of marine inhabitants to both the temperature and water conditions which exist in a new aquarium environment.

It is a further object of this invention to accomplish this result while minimizing the risk of the marine inhabitants escaping during acclimation.

Yet still another object of this invention is to provide a device for the introduction and acclimation of marine inhabitants in an aquarium such that water in which the marine inhabitant has been transported need not be introduced into the aquarium, whereby the likelihood of contamination of the aquarium can be prevented.

One other object of this invention is to provide a device for the introduction and acclimation of marine inhabitants in an aquarium such that the marine inhabitant can be easily released into the aquarium after acclimation is completed.

Briefly, the foregoing and other objects will be readily achieved in accordance with the present invention, wherein a device for the introduction and acclimation of a marine inhabitant in an aquarium includes a lower first container and an upper second container positioned on the top of the first container and preferably integrally formed therewith. The lower first container has imperforate side and bottom walls which in use are partially submerged in the aquarium and into which a controlled quantity of transportation water containing the marine inhabitant is introduced. An apparatus for attaching the first container to an edge of the aquarium such that the partial submerging thereof is realized is provided and the second container is connected to the first container through a valving means for producing a flow of a second controlled quantity of water from the second container into the first container at a controlled rate, whereby the marine inhabitant is automatically and accurately acclimated to the temperature and water.

BRIEF DESCRIPTION OF THE DRAWINGS

A more complete appreciation of the invention and many of the attendant advantages thereof will be readily obtained as the same becomes better understood by reference to the following detailed description when considered in conjunction with the accompanying drawings, wherein.

DESCRIPTION OF THE PREFERRED EMBODIMENTS

Figure 1:
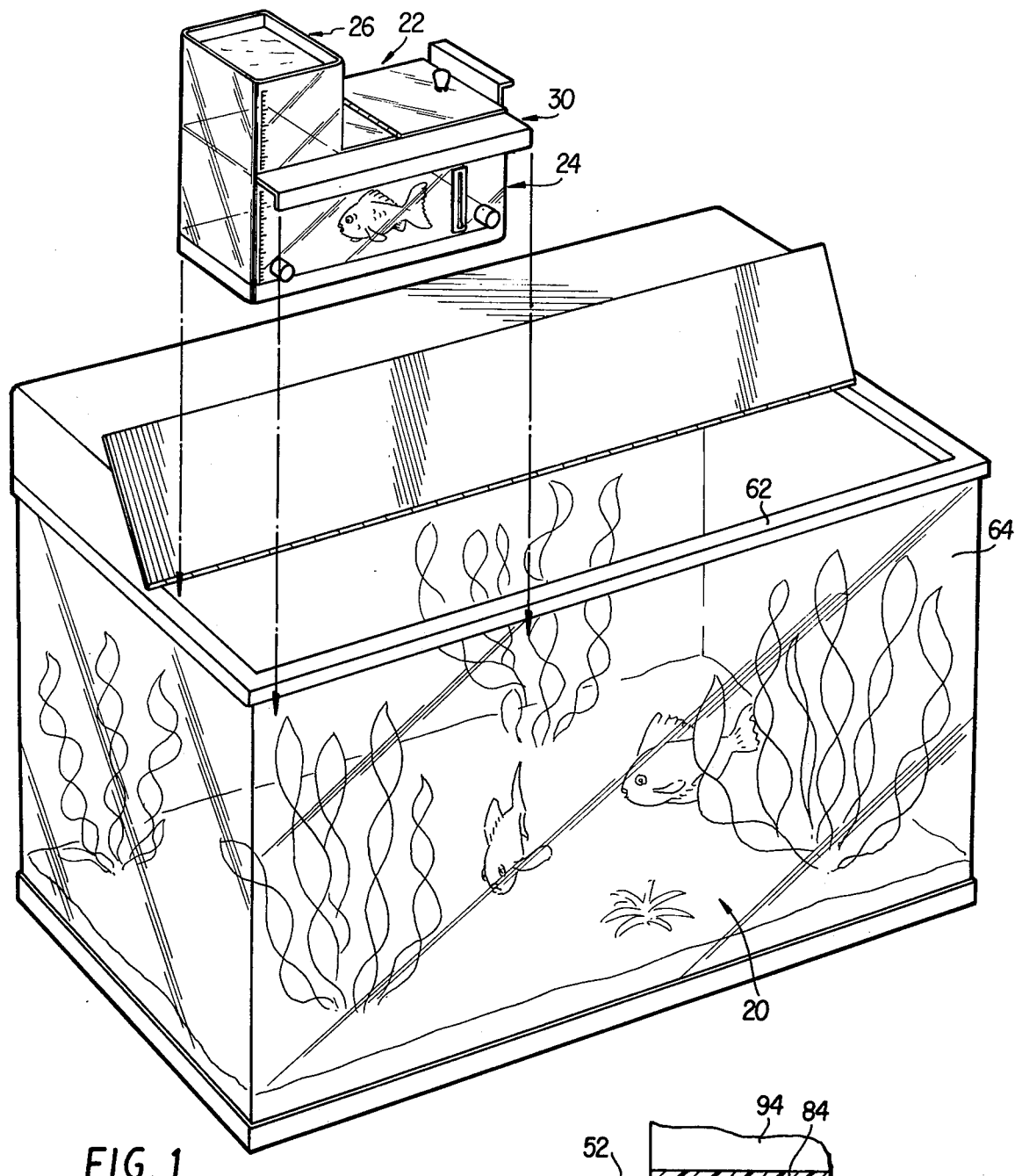
FIG. 1 is a perspective view of an aquarium showing the manner in which the device is attached thereto.

Referring now to the drawings, wherein like reference numerals designate identical or corresponding parts throughout the several views, and more particularly to FIG. 1 thereof, reference numeral 20 designates an aquarium for keeping marine inhabitants, while 22 designates generally the introduction and acclimation device of the present invention. The introduction and acclimation device 22 generally includes a lower first container 24 which is partially submerged in the water held by the aquarium 20, a second container 26 mounted on the first container 24, and an integral mounting or attaching mechanism 30. While device 22 may be constructed from many different non-toxic materials, clear plastic would be the preferred choice of construction. The device 22 should be constructed of a width such that it easily fits within the opening of a standard aquarium cover hood.

Figure 2:
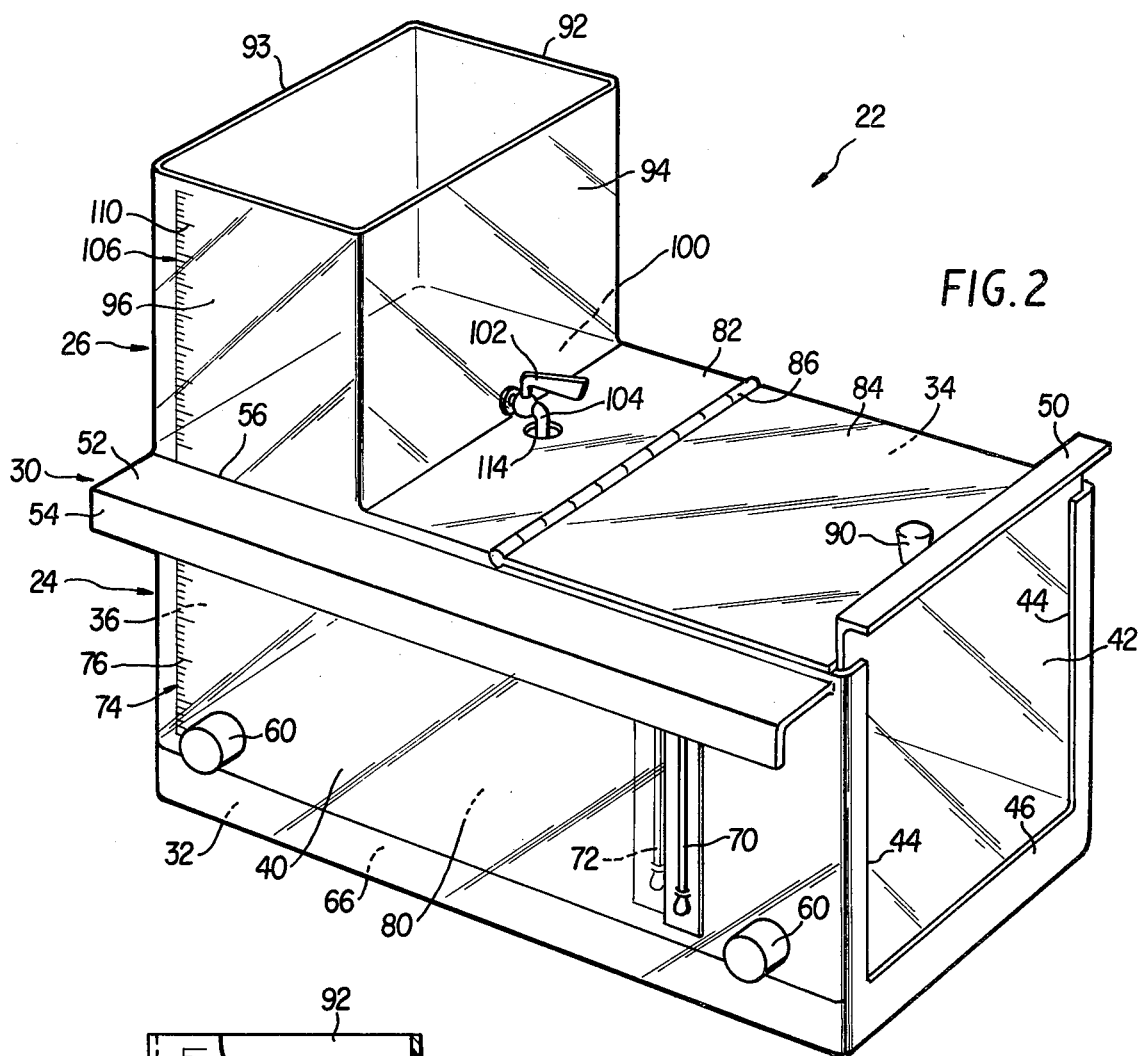
FIG. 2 is a perspective view of the device removed from the aquarium as seen from the front end thereof.
Figure 3:
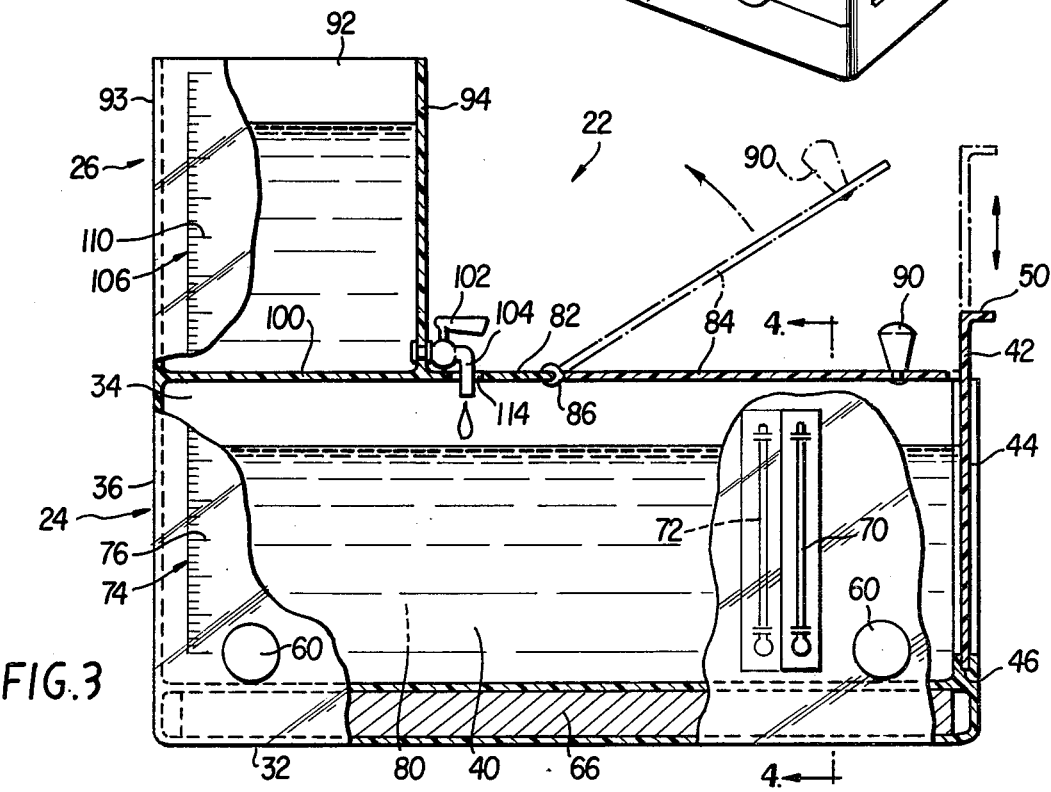
FIG. 3 is a front sectional view of the device taken from FIG. 2.

Referring now to FIG. 2 and FIG. 3, the introduction and acclimating device 22 of the subject invention is disclosed in greater detail. The first container 24 is seen to include a bottom panel 32, a rear panel 34, a left-side panel 36, a front panel 40, and a right-side panel 42. Right-side panel 42 is slidably mounted within slides 44 which are integrally attached to front and rear panels 40 and 34. Bottom panel 32 incorporates a groove 46 which mates with right-side panel 42 when the side panel is in its closed position. Right-side panel 42 includes an upper portion 50 which extends beyond the top of the first container 24 and acts as a handle or gripping means for removing panel 42. When panel 42 is in its closed position, slides 44 and groove 46 act to maintain an essentially water-tight seal with panel 42, thereby preventing movement of water between aquarium 20 and the introduction and acclimation device 22.

The mounting or attaching mechanism 30 includes a hanger surface 52 and an integral lip portion 54. The mounting mechanism 30 is fixedly attached to the first container 24 at the intersection of hanger surface 52 and front panel 40, the intersection being designated by numeral 56. Spacers 60 are provided and may be cylindrical shaped solid members which are fixedly attached to front panel 40 near its lower corners. When the introduction and acclimation device 22 is placed in aquarium 20, mounting mechanism 30 acts to support the device 22 by contacting edge 62 of the aquarium. Integral lip portion 54 extends somewhat over the outside portion of edge 62 and thereby prevents the device from sliding into the aquarium. The spacers 60 contact the inner surface of the adjacent side wall 64 of the aquarium to space device 22 away from the side walls 64 and thereby allow for the circulation of water within the space thereby created. Additionally, the spacers, in conjunction with mounting mechanism 30, act to keep device 22 essentially level.

Bottom panel 32 includes a weighted structure 66 which is somewhat smaller than panel 32 in area. The weighted structure may be a heavy material such as lead, iron, sand, or the like. Due to toxicity problems, this heavy material must be completely encapsulated within the non-toxic material used to form bottom panel 32. The quantity of heavy material used must be such that when introduction and acclimation device 22 is placed in the aquarium, the buoyant force produced by the water in the aquarium on device 22 is counteracted. As an alternative, weighted structure 66 could take the form of a plurality of encapsulated lump structures which are placed in the lower corners of the first container 24.

Figure 4:
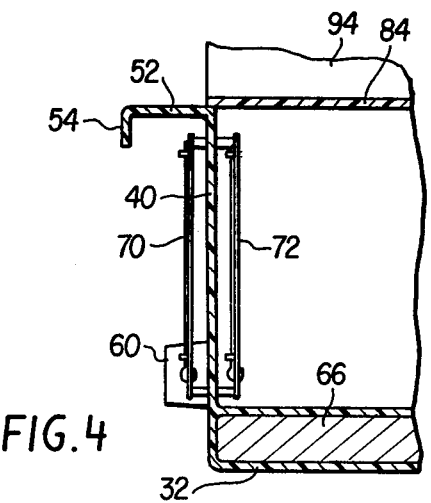
FIG. 4 is a fragmentary vertical section taken along line 4—4 of FIG. 3.

Attached to front panel 40 are two thermometers 70 and 72, as shown in FIGS. 2-4. Thermometer 70, fixedly attached to the outer surface of front panel 40, is used to measure the temperature of the water in the aquarium 20, whereas thermometer 72 is fixedly attached to the inside surface of front panel 40 where it is used to measure the temperature of the water which has been introduced into the first container 24. Thus, through the use of thermometers 70 and 72, any differential between the temperatures of the water in the aquarium 20 and in the first container 24 may be readily determined and easily observed. It should be understood that while the drawings disclose the use of bulb thermometers, such as of mercury or alcohol, other temperature-measuring devices such as dial thermometers or temperature-sensitive liquid crystal strips could also be used.

Also included within front panel 40 is a vertical scale 74 having a plurality of calibration marks 76. Calibration marks 76 are arranged such that a determination of the volume of water 80 within first container 24 may be readily made by simply noting the point of intersection of the surface of water 80 and vertical scale 74. The calibration marks 76 may indicate the volume of water held by first container 24 in convenient units, such as cubic centimeters, cubic inches, ounces, liters, or the like.

First container 24 also includes a covering means which includes a fixed cover panel 82, a movable cover panel 84, a hinge mechanism 86, and a handle mechanism 90. The fixed cover panel 82 is attached to the first container 24 at the upper edges of rear-side panel 34, left-side panel 36, and front panel 40. It should be apparent that, while the fixed cover panel could enclose any portion of the upper opening of the imperforate container 24, convenience dictates that no more than half of this opening be enclosed. Movable cover panel 84 cooperates with the fixed cover panel 82 to completely enclose the upper opening of the first container 24. The movable cover panel 84 is pivotably attached to the fixed cover panel 82 by means of the hinge mechanism 86 and rests in its lower position on the upper edges of rear-side panel 34 and front-side panel 40. When in its raised position, the movable cover panel 84 allows access to the interior of first container 24. The hinge mechanism 86 may take the form of any simple conventional hinge of non-metallic or non-toxic material. The movable cover panel 84 also incorporates the handle mechanism 90 as a means for conveniently gripping panel 84 for movement.

Reference numeral 26 generally designates a second container which is comprised of a bottom panel 100, a rear panel 92, a left-side panel 93, a right-side panel 94, and a front panel 96. The second container 26 is watertight and is constructed from any waterproof non-toxic material, with clear plastic being preferred. The second container 26 is integral with and permanently attached to first container 24. While other sizes will suffice, it is contemplated that the second container 26 will conveniently fit on top of the fixed cover panel portion of container 24 and will enclose a volume of approximately one-half of that enclosed by the first container 24.

Attached to the lower mid-area of the right-side panel 94 of the second container 26 is a valve 102 which is further connected to an outlet pipe 104. Valve 102 is adjustable from fully closed up to a maximum flow which, for example, might be as high as two cubic centimeters per minute. Valve 102 and pipe 104 cooperate to allow water held by the second container 26 to drain at a controlled rate. As an alternative, valve 102 could be replaced by a fixed orifice within outlet pipe 104 such that the rate of drainage is a preset constant.

The fixed cover panel 82 of the first container 24 includes a circular opening 114 through which outlet pipe 104 of the second container 26 is inserted when the second container 26 is positioned on top of the fixed cover 82 of the first container 24. Thus the water held by the second container 26 may drain at a controlled rate into the first container 24.

The second container 26 also includes a volume scale 106 which is located on front panel 96. This scale incorporates a plurality of calibration marks 110 which are used to indicate the volume of water held by the second container. Again, any convenient volume units could be used, however, these units should correspond to those used by the vertical scale 74 of the first container 24.

Operation of the illustrated embodiment of the present invention is now described as follows. The right-side panel 42 of the first container 24 is slid into its closed position by means of slides 44 and groove 46. The first container 24 is then placed in aquarium 20 and mounted on edge 62 by means of the mounting mechanism 30. Movable cover panel 84 is opened by the use of the handle mechanism 90. A marine inhabitant and the water in which it was transported is then introduced into the first container 24 through the opening controlled by the cover panel 84. The cover panel 84 is closed and the volume of water in the first container 24 is noted on scale 74. A quantity of water is removed from the aquarium 20 by any convenient means, such as a common water glass, and is introduced into the second container 26. The quantity of water held by second container 26 may be determined by means of the scale 106. Valve 102 is then adjusted such that the water held by the second container 26 is drained into the first container 24 at any desired rate. After a sufficient passage of time, the water held by the second container 26 will have completely drained into the first container 24 and the temperature differential between the water held by the first container 24 and the water in the aquarium 20 will have equalized, as determined by thermometers 70 and 72. Right-side panel 42 is then removed from first container 24 thereby allowing the marine inhabitant to swim or float into the aquarium 20. Alternately, right-side panel 42 may be left in place and the marine inhabitant may be removed by means of a net or other suitable means such that none of the now diluted and potentially detrimental transportation water held by the first container 24 is introduced into the aquarium 20. The introduction and acclimation device is then removed and the aquarium 20 is returned to its normal condition. In such a manner, it should be clearly understood that with the present invention the marine inhabitant has been introduced and acclimated to its new environment in an automatic, simple and trouble-free manner.

Obviously, numerous modifications and variations of the present invention are possible in light of the above teachings. For example, while the second container 26 has been described as being integrally formed upon the first container 24, in fact the second container 26 could be separately mounted upon the imperforate first container 24. It is therefore to be understood that within the scope of the appended claims, the invention may be practiced otherwise than as specified herein.

What is claimed as new and desired to be secured by Letters Patent of the United States is:

1. A device for the introduction and acclimation of a marine inhabitant in an aquarium, comprising:
   a first container having side and bottom walls which are partially submerged in said aquarium and into which a controlled quantity of transportation water containing said marine inhabitant is introduced;
   means for attaching said first container to an edge of said aquarium such that said partial submerging is realized;
   a second container connected to said first container and into which a second controlled quantity of water is introduced; and
   valving means for producing a flow of said second controlled quantity of water from said second container into said first container at a controlled rate, whereby said second container is isolated from said aquarium such that water flow from said first container into said second container is prevented and water flow from said second container directly into said aquarium is prevented, whereby said marine inhabitant is automatically and accurately acclimated to the temperature and water conditions in said aquarium.

2. The device of claim 1, further comprising means for opening one side wall of said first container to permit water flow between said first container and said aquarium.

3. The device of claim 1 further comprising:
   means for simultaneously determining the temperatures of the water within said aquarium and the water within said first container.

4. The device of claim 1 further comprising:
   means for determining the quantity of said controlled quantity of water in said first container.

5. The device of claim 1 further comprising:
   means for determining the quantity of said controlled quantity of water in said second container.

6. The device of claim 1 further comprising:
   means for covering said first container.

7. The device of claim 1 further comprising:
   means for weighting the bottom of said first container to counteract bouyant forces of the water within said aquarium.

* * * * *